United States Patent
Winter

(10) Patent No.: US 12,027,744 B2
(45) Date of Patent: Jul. 2, 2024

(54) COMMUNICATION SYSTEM

(71) Applicant: Conductix-Wampfler GmbH, Weil am Rhein (DE)

(72) Inventor: Nicholas Winter, Lörrach (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 224 days.

(21) Appl. No.: 17/429,697

(22) PCT Filed: Sep. 26, 2019

(86) PCT No.: PCT/EP2019/075999
§ 371 (c)(1),
(2) Date: Aug. 10, 2021

(87) PCT Pub. No.: WO2021/004645
PCT Pub. Date: Jan. 14, 2021

(65) Prior Publication Data
US 2022/0209384 A1 Jun. 30, 2022

(30) Foreign Application Priority Data
Jul. 9, 2019 (DE) ...................... 10 2019 118 533.5

(51) Int. Cl.
*H01Q 13/22* (2006.01)
*H01P 3/12* (2006.01)
(Continued)

(52) U.S. Cl.
CPC ............. *H01P 3/12* (2013.01); *H01Q 1/3225* (2013.01); *H01Q 13/20* (2013.01); *H04W 4/40* (2018.02)

(58) Field of Classification Search
CPC ........... H01P 3/12; H01P 5/18; H01Q 1/3225; H01Q 13/20; H01Q 13/22; H04W 4/40
See application file for complete search history.

(56) References Cited

U.S. PATENT DOCUMENTS 3,278,850 A 10/1966 Tomizawa
5,057,797 A * 10/1991 Heddebaut ........... H01Q 1/3225
333/248

(Continued)

FOREIGN PATENT DOCUMENTS

CN 101373860 A 2/2009
CN 102893451 A 1/2013
(Continued)

OTHER PUBLICATIONS

International Preliminary Report on Patentability, dated Jan. 11, 2022, for PCT/EP2019/070007 (English translation).
(Continued)

*Primary Examiner* — Awat M Salih
(74) *Attorney, Agent, or Firm* — Paul D. Bianco; Stephen Bongini; Fleit Intellectual Property Law

(57) ABSTRACT

A communication system for communication between at least one vehicle guided along a predefined movement path and a stationary station using a slotted waveguide which extends parallel to the movement path of the vehicle and into which at least one antenna connected to a transceiver unit of the stationary station and at least one antenna of the vehicle project. The antenna of the vehicle is moved in the longitudinal direction of the slotted waveguide with movement of the vehicle. The slotted waveguide includes at least two sections separated from one another by a respective gap. At least one antenna projecting into the respective section is provided for each section of the slotted waveguide. Two neighboring antennas projecting into different sections of the slotted waveguide are coupled via a coupling device both to a common transceiver unit of the stationary station and to one another.

15 Claims, 2 Drawing Sheets

(51) Int. Cl.
  *H01Q 1/32* (2006.01)
  *H01Q 13/20* (2006.01)
  *H04W 4/40* (2018.01)

(56) References Cited

U.S. PATENT DOCUMENTS

| | | | |
|---|---|---|---|
| 6,091,372 | A | 7/2000 | Dienes |
| 6,108,313 | A | 8/2000 | Lee |
| 9,136,571 | B2 | 9/2015 | Papziner |
| 9,824,805 | B2 | 11/2017 | Wechlin |
| 11,897,526 | B2 | 2/2024 | Winter |
| 2020/0044360 | A1* | 2/2020 | Kamo ............. G01S 7/03 |
| 2020/0223658 | A1 | 7/2020 | Bauer |
| 2022/0105971 | A1 | 4/2022 | Winter |
| 2022/0209388 | A1 | 6/2022 | Winter |

FOREIGN PATENT DOCUMENTS

| | | | |
|---|---|---|---|
| CN | 104245402 | A | 12/2014 |
| CN | 105281042 | A | 1/2016 |
| CN | 107104697 | A | 8/2017 |
| DE | 102012006412 | A1 | 10/2012 |
| DE | 102012002183 | A1 | 8/2013 |
| DE | 102013002227 | B4 | 11/2014 |
| EP | 1998403 | A1 | 12/2008 |
| JP | 08046545 | A | 2/1996 |
| JP | H10215202 | A | 8/1998 |
| JP | 11284542 | A | 10/1999 |
| JP | 2005051623 | A | 2/2005 |
| WO | 2018/095803 | A1 | 5/2018 |
| WO | 2021/004643 | A1 | 1/2021 |
| WO | 2021/004646 | A1 | 1/2021 |

OTHER PUBLICATIONS

International Preliminary Report on Patentability, dated Jan. 11, 2022, for PCT/EP2019/076000 (English translation).
International Preliminary Report on Patentability, dated Jan. 11, 2022, for PCT/EP2019/075999 (English translation).
Written Opinion dated Mar. 30, 2020, for PCT/EP2019/070007 (English translation).
Written Opinion dated Apr. 9, 2020, for PCT/EP2019/076000 (English translation).
Written Opinion dated Apr. 9, 2020, for PCT/EP2019/075999 (English translation).
Japanese Office Action dated Sep. 20, 2022 for Application No. 2021-529717 with translation (11 pages).
W. D. Schuck and R. Rieger, The Slotted-Waveguide Communication System of the Maglev Test Range in the Emsland, 1983, 13th European Microwave Conference, IEEE, 1983, pp. 681-686.
International Search Report and Written Opinion for PCT/EP2019/076000, dated Sep. 26, 2019.
Schuck, The slotted-waveguide communication system of the maglev test range, Proceedings of the 13th European Microwave Conference, Sep. 8, 1983, (p. 681-686).
Vahle, SMG-Slotted Microwave Guide, May 17, 2006 (36 pages).
International Search Report dated Mar. 9, 2020 for PCT/EP2019/075999 filed Sep. 26, 2021.
Written Opinion for PCT/EP2019/075999 filed Sep. 26, 2021.
International Search Report and Written Opinion for PCT/EP2019/070007, filed Jul. 25, 2019.
Schweber, RF Attenuators: For When You Have Too Much of a Good Thing, Sep. 10, 2015, retrieved from www.digikey.nl/en/articles/techzone/2015/sep/rf-attenuators-for-when-you-have-too-much-of-a-good-thing.
Chinese First Office Action dated Sep. 28, 2023 for Chinese Application No. 201980089507.X.
Office Action dated Oct. 2, 2023 for U.S. Appl. No. 17/429,686.
Response filed Jan. 2, 2024 for U.S. Appl. No. 17/429,686.
Notification of Reasons for Refusal dated Nov. 7, 2023 for Japanese Application No. 2021-529716.
Notification of Reasons for Refusal dated Aug. 22, 2023 for Japanese Application No. 2021-529715.
Office Action dated Feb. 28, 2024 for U.S. Appl. No. 17/429,686.

\* cited by examiner

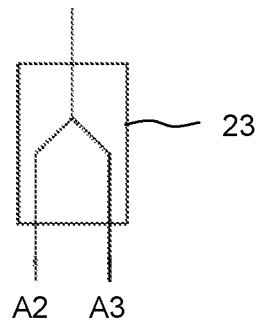
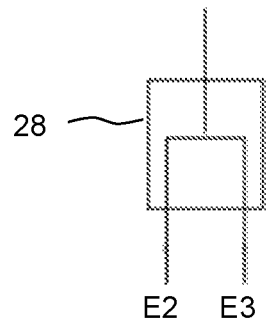
Fig. 3
Fig. 5
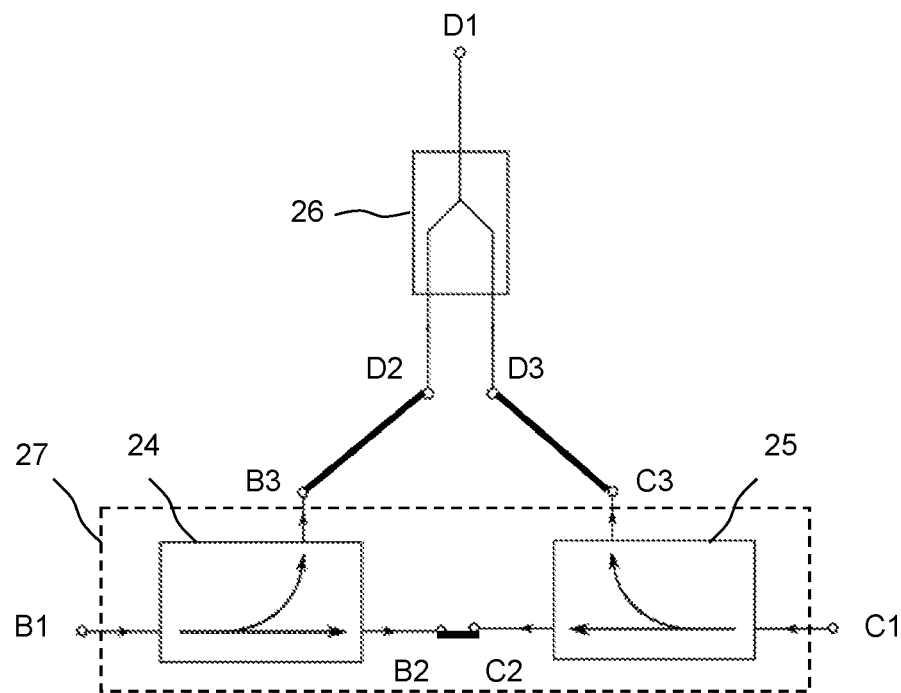
Fig. 4

COMMUNICATION SYSTEM

FIELD OF THE INVENTION

The invention concerns a communication system.

BACKGROUND OF THE INVENTION

Such a communication system is known, for example, from DE 10 2013 002 227 B4. It permits communication with high bandwidth and noise immunity between a vehicle guided along a predetermined movement path and a fixed station. An antenna is arranged on a vehicle so that it projects through a slot into the cavity of a waveguide and can receive and/or transmit electromagnetic waves propagating along the waveguide while the vehicle is moving. A corresponding antenna of a fixed station is arranged at one end of the waveguide.

The communication range in such a system is limited by the attenuation of the electromagnetic waves during their propagation along the slotted waveguide. A slotted waveguide of great length must also be assembled from several sections, which produces the problem of deformation as a result of thermal change in length during temperature changes.

SUMMARY OF THE INVENTION

One aspect of the invention relates to an expedient solution to implement a large range for a generic communication system that permits reliable communication even at great length of the movement path of the vehicle.

Accordingly, a communication system is disclosed herein. Advantageous embodiments are also disclosed.

According to the invention, the slotted waveguide consists of at least two sections separated from each other by a gap in a communication system for communication between a vehicle guided along a predetermined movement path and a fixed station using a slotted waveguide that extends parallel to the movement path of the vehicle and into which project at least one antenna connected to the transmitting and receiving device of the vehicle and at least one antenna connected to the transmitting and receiving device of the fixed station, wherein the antenna of the vehicle is moved in the longitudinal direction of the slot during movement of the vehicle. For each section of the slotted waveguide at least one antenna projecting into the corresponding section is provided and the two adjacent antennas projecting into different sections of the slotted waveguide are coupled via a coupling device with a common transmitting and receiving device of the fixed station and with each other.

The gap between the sections of the slotted waveguide permits a thermal change in length of the individual sections, and the transmitting and receiving device can communicate with vehicles in the region of both sections by arranging an antenna in each section. Moreover, coupling of both sections with each other via the coupling device bridges the gap between the sections and permits communication over the gap from one section to another. This is of particular significance for noise immunity of communication, since the transmitting and receiving devices of the vehicles must be capable of receiving transmitted signals from transmitting and receiving devices of other vehicles in order to recognize collisions with their own transmitted signals or avoid them from the outset.

In a first expedient implementation, the coupling device consists of a reciprocal reactive 2-way power divider with an input connection and two output connections, whose input connection is connected to the transmitting and receiving device and whose output connections are connected to one of the antennas. The terms input connection and output connections here refer to the direction of transmission in which a supplied power is divided into two smaller partial powers, wherein the transmission behavior is reciprocal.

As an alternative, the coupling device in an second expedient implementation has two reciprocal 2-way directional couplers and a reciprocal 2-way power divider, in which case the input connections of the directional coupler are each connected to one of the antennas, an output connection of each directional coupler is connected to the corresponding output connection of the other directional coupler, the other output connection of each directional coupler is connected to one of the output connections of the power divider, and the input connection of the power divider is connected to the transmitting and receiving device. Here again, the terms input connection and output connections both in the power divider and in the directional couplers refer to the direction of transmission in which a supplied power is divided into two smaller partial powers, wherein the transmission behavior is also reciprocal.

A particularly expedient form of a power divider for use in the second embodiment is a Wilkinson divider. The two 2-way directional couplers connected to each other at an output connection can also be expediently combined to form a structural unit with four external connections.

The power divider used in the two embodiments of the coupling device is preferably symmetrical, i.e., a power supplied at the input is divided at the two outputs into two equal partial powers, but due to unavoidable losses, these are each less than half the supplied power. The use of a symmetrical power divider is especially advantageous when the sections of the slotted waveguide to which a power sent from the transmitting and receiving device is to be distributed are of the same length. In the opposite direction of transmission, when a signal is supplied to one of the output connections, the proportion of supplied power available at the input connection is the same regardless to which input connection it is supplied.

In a third expedient implementation of the coupling device, it consists of a reciprocal 2-way tapper with a branch connection and two through connections, where the branch connection is connected to the transmitting and receiving device and the through connections are each connected to one of the antennas. The particular advantage of a tapper lies in the limited insertion loss between the two through connections, which is particularly advantageous for coupling of the two antennas in the different sections of the slotted waveguide with limited attenuation and therefore advantageous for direct signal transmission from one section to another.

The tapper in the third implementation of the coupling device is preferably symmetrical, i.e., when a signal is supplied at the branch connection, an equal part of the supplied power is coupled at each of the two through connections, in which case losses also occur here so that the power available on the two through connections is much smaller than half the supplied power. The use of a symmetrical tapper is particularly advantageous when the sections of the slotted waveguide to which a signal sent from the transmitting and receiving devices is to be distributed are of the same length. In the opposite direction of transmission, when a signal is supplied at one of the through connections, the proportion of supplied power available at the branch connection is the same, regardless to which through connection it is supplied.

The invention is not restricted to a slotted waveguide consisting of two sections, but it is particularly useful if the slotted waveguide has a number of sections separated from each other by a gap and a number of transmitting and receiving devices are provided, each of which is connected to two antennas each projecting into different sections of the slotted waveguide via a coupling device assigned to it. According to the invention, very long transmission paths can thus be implemented for transport systems with very long movement paths of the vehicles.

When the slotted waveguide consists of a number of sections and accordingly a number of different transmitting and receiving devices of the fixed station are provided, they can also communicate at least partially via different channels with the transmitting and receiving devices of the vehicle. Through direct connection of individual sections via the coupling devices, signals can also be transmitted between a stationary transmitting and receiving device and a transmitting and receiving device of a vehicle, which is situated in the region of another section of the slotted waveguide, into which no antenna of the stationary transmitting and receiving device projects, over a gap between different sections of the slotted waveguide. Simultaneous communication is thus made possible in different channels over the boundaries of sections of the slotted waveguide.

BRIEF DESCRIPTION OF THE DRAWINGS

Embodiment examples of the invention are described below with reference to the drawings. In the drawings FIG. 3 shows the circuit symbol of a reactive 2-way power divider suitable as a coupling device, FIG. 4 shows a block diagram of a combination of two directional couplers and a 2-way power divider suitable as coupling device, and FIG. 5 shows the circuit symbol of a 2-way tapper suitable as a coupling device.

DETAILED DESCRIPTION OF THE INVENTION

Figure 1:
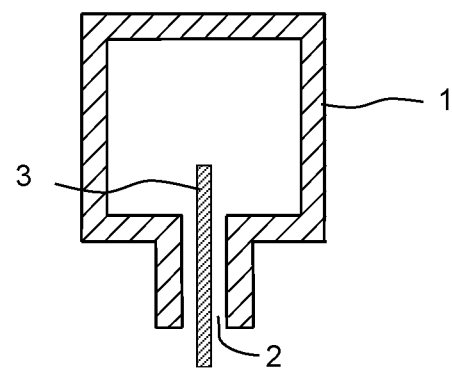
FIG. 1 shows a schematic cross-sectional view of a slotted waveguide with an antenna projecting into it.

FIG. 1 shows a schematic cross-sectional view of a slotted waveguide 1 as used in the prior art in a communication system for communication between vehicles 4 and 5 guided along a predetermined movement path (FIG. 2) and a fixed station 6 and/or between several such vehicles 4 and 5 with each other. An antenna 3 of a vehicle projects through slot 2 into slotted waveguide 1 in order to send and receive electromagnetic waves that propagate along the slotted waveguide 1. When a vehicle 4 or 5 moves along its predetermined movement path, the antenna 3 is then moved together with it in the longitudinal direction of the slotted waveguide 1. The vehicle 4 or 5 can be guided in particular via rails along a prescribed travel path.

Figure 2:
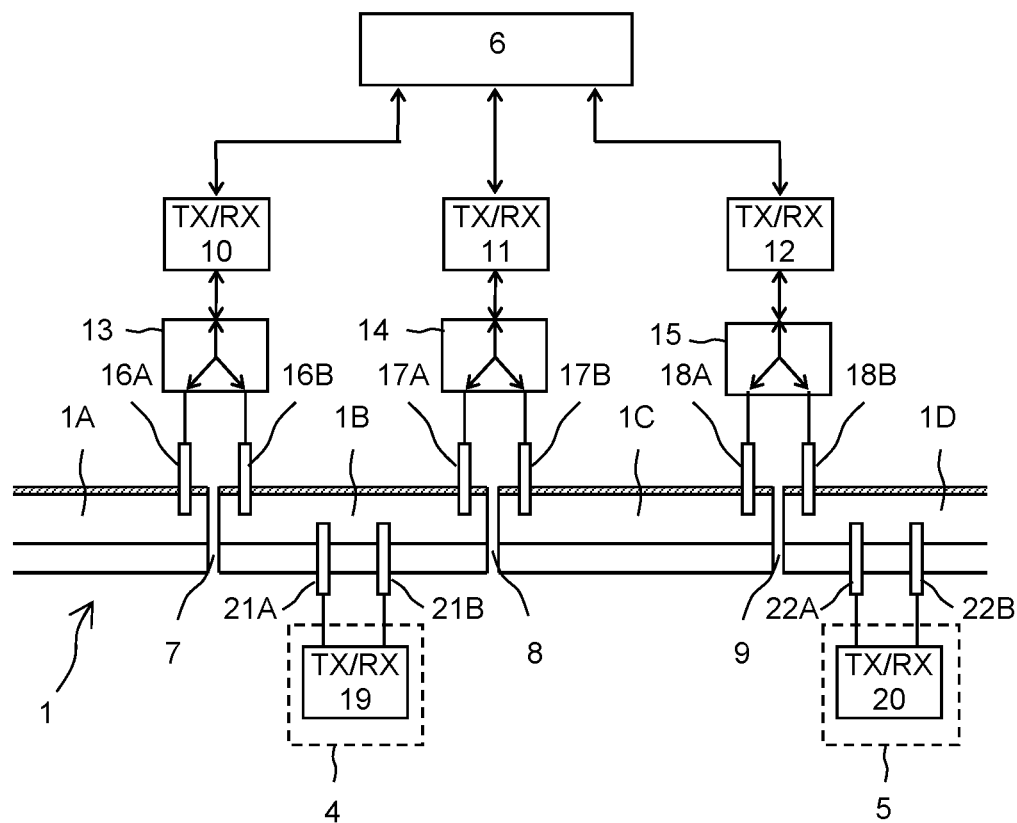
FIG. 2 shows a schematic longitudinal section of a slotted waveguide according to FIG. 1 with a block diagram of additional components of the communication system according to the invention.

As shown in FIG. 2, the slotted waveguide 1 consists of several separate sections 1A, 1B, 1C and 1D, each of which are separated from each other by a gap 7, 8 or 9. The gaps 7 to 9 are necessary because the slotted waveguide 1 has a length that cannot be realized in a single piece and a change in length must be possible for sections 1A to 1D with changes in temperature. Due to the large overall length of slotted waveguide 1, the fixed station 6 is connected to several transmitting and receiving devices 10, 11 and 12, hereinafter referred to as transceivers, which are distributed along the slotted waveguide 1. Each transceiver 10 to 11 is connected to two antennas 16A and 16B or 17A and 17B or 18A and 18B via a coupling device 13 or 14 or 15, each of which projects into one of two adjacent sections 1A and 1B or 1B and 1C or 1C and 1D of the slotted waveguide 1. Signals from transceiver 10 can therefore be coupled into sections 1A and 1B via coupling device 13, and signals can be coupled out of sections 1A and 1B to transceiver 10 via coupling device 13. The same naturally applies for sections 1B and 1C, transceiver 11 and the coupling device 14, as well as for sections 1C and 1D, transceiver 12 and coupling device 15.

The vehicles 4 and 5 are also equipped with a transmitting and receiving device 19 or 20, hereinafter referred to as transceivers, each of which has two antenna connections and is connected via these connections to two antennas 21A and 21B or 22A and 22B. The antennas 21A and 21B as well as antennas 22A and 22B each have a spacing from each other in the longitudinal direction of the slotted waveguide 1 that is greater than the width of a gap 7 to 9, so that in each possible position of a vehicle 4 or 5 one of its two antennas 21A or 21B and 22A or 22B always projects into one of the sections 1A to 1D of the slotted waveguide 1 and is therefore ready to transmit and receive.

Bidirectional communication between fixed station 6 and vehicle 4 is possible at any time via at least one of the three transceivers 10 to 12, one of the coupling devices 13 to 15 and one of the six stationary antennas 16A to 18B, as well as one of the antennas 21A or 21B on the vehicle side and transceiver 19 by means of the configuration just described, regardless of the instantaneous positions of vehicles 4 and 5. The same applies analogously to bidirectional communication between the fixed station 6 and the vehicle 5, on the side of which one of the antennas 22A or 22B and transceiver 20 then participate.

The stationary coupling device 13 according to the invention connects not only the transceiver 10 to the antenna 16A and 16B assigned to it, but also the antennas 16A and 16B that project into one of the adjacent sections 1A and 1B of the slotted waveguide 1. The latter correspondingly applies to the coupling device 14 and the sections 1B and 1C as well as to the coupling device 15 and sections 1C and 1D. The coupling devices 13 to 15 therefore simultaneously also bridge gaps 7 to 9 and permit continuous signal transmission along the slotted waveguide 1 over gaps 7 to 9 between its sections 1A to 1D. It is understood that the coupling devices 13 to 15 produce a certain insertion loss between the antennas 16A and 16B or 17A and 17B or 18A and 18B connected to them. However, this is very limited in comparison with the attenuation that gaps 7 to 9 would cause without the coupling devices 7 to 9.

One possible implementation of each of the coupling devices 13 to 15 is a reactive 2-way power divider 23, also called a splitter, which, as such, belongs to the prior art. The circuit symbol of such a reactive 2-way power divider 23 is shown in FIG. 3. It distributes a signal power supplied at its input connection A1 according to a predetermined division ratio to the output connections A2 and A3, but absorbs part of the supplied power. Said ratio is 1:1 in a symmetrical power divider. In the opposite direction of operation, it acts as a combiner and combines the signal power at connection A1 supplied to connections A2 and A3.

A second possible implementation of each of the coupling devices 13 to 15 is the combination of two directional couplers 24 and 25 shown in FIG. 4, which, as such, also belong to the prior art, with a 2-way power divider 26. The directional coupler 24 connects an input connection B1 directly to an output connection B2 and couples the input connection B1 with low attenuation with a second output connection B3, but decouples the output connections B2 and B3 from each other. The same applies in the second directional coupler 25 for the input connection C1 and the output connections C2 and C3. For implementation according to the invention of one of the coupling devices 13 to 15, the output connections B2 and C2 of the two directional couplers are connected to each other, and the other output connections B3 and C3 are each connected to an output connection D2 or D3 of the 2-way power divider 26. According to the invention, the input connection D1 of power divider 26 is connected to one of the transceivers 13 to 15, and the input connections B1 and C1 of the directional couplers 24 and 25 are each connected to one of the antennas 16A and 16B or 17A and 17B or 18A and 18B.

Due to the reciprocity of both the directional couplers 24 and 25 and the power divider 26, the circuit of FIG. 4 in principle also functions in both transmission directions, i.e., both as a power divider and as a combiner. Instead of a circuit of two separate directional couplers 24 and 25, a directional coupler 27 with four connections Bl, B3, C1 and C3 can be used, which provides the same function and is already designed in the form of a structural unit, which is indicated in FIG. 4 by a dashed outline. The power divider 26 in this variant is not intended to couple its two output connections D2 and D3 with each other, since coupling between the input connections B1 and C1 of directional coupler 24 and 25 is already produced via their directly connected output connections B2 and C2. A power divider that decouples its two output connections from each other, such as a Wilkinson divider in particular, is therefore better suited in this variant as power divider 26 instead of a reactive power divider 23.

A third possible implementation of each of the coupling devices 13 to 15 is 2-way tapper 28, which, as such, also belongs to the prior art. The circuit symbol of such a 2-way tapper 28 is shown in FIG. 5. It couples part of a signal power supplied at its branch connection E1 to the through connections E2 and E3 in a predetermined ratio. This ratio is 1:1 in a symmetrical tapper. In the opposite operating direction, it couples one part of the signal powers supplied at the through connections E2 and E3 with connection E1. Whereas coupling of the branch connection E1 with each of the through connections E2 and E3 is connected with significant attenuation, the through connections E2 and E3 are coupled to each other with comparatively limited attenuation.

The insertion losses of the three variants of a coupling device 13 to 15 between the transceiver connection and the antenna connections, on the one hand, and between the antenna connections to each other, on the other, differ significantly. In a 2-way tapper 28, the insertion loss between the antenna connections E2 and E3 is generally the lowest, whereas in a reactive 2-way power divider 23 the insertion loss between the transceiver connection A1 and the antenna connections A2 and A3 is lowest. With a combination of two directional couplers 24 and 25 with a 2-way power divider 26, the insertion loss between the antenna connections B1 and C1 is generally lower than in a reactive 2-way power divider 23 alone, but higher than in a 2-way tapper 28, and the insertion loss between the transceiver connection D1 and the antenna connections B1 and C1 is higher than in the other two variants.

The choice of a variant should be made after considering and weighing different requirements. If the least possible insertion loss between adjacent sections of the slotted waveguide 1 is important, a 2-way tapper would appear to be optimal and the combination of two directional couplers with a power divider would be the second best solution. In the case of different lengths of the sections 1A to 1D of the slotted waveguide 1, asymmetrical power division ratios of the coupling devices 13 to 15 may be useful, but it is generally expedient to select the lengths of sections 1A to 1D to be all the same and accordingly also to provide coupling devices 13 to 15 with a symmetrical power division.

One consideration in which a low insertion loss between the antenna connections of a coupling device 13 to 15 appears to be particularly important is communication between different stationary transceivers and different transceivers on the vehicle side via different channels, where a channel denotes a frequency band of a specific width. For example, it might be desirable in the configuration of FIG. 2 for the transceiver 11 to communicate with the transceiver 20 via a first channel X and transceiver 12 with transceiver 19 via a second channel Y, for which purpose the signal on channel X must be transmitted over the gap 9 and the signal on channel Y over the gap 8, for which a low insertion loss of the coupling devices 14 and 15 between antennas 17A and 17B or between antennas 18A and 18B is desirable.

The invention claimed is:

1. A communication system for communication between a vehicle guided along a predetermined movement path and a fixed station using a slotted waveguide that extends parallel to the movement path and into which projects at least one antenna of the vehicle, wherein the at least one antenna of the vehicle is moved in the longitudinal direction of the slotted waveguide during movement of the vehicle, and the slotted waveguide includes two sections separated from each other by a gap, the communication system comprising:
 a transmitting and receiving device of the fixed station;
 at least two antennas of the fixed station, one of the antennas of the fixed station projecting into one of the sections of the slotted waveguide, and another of the antennas of the fixed station projecting into the other of the sections of the slotted waveguide, which is separated from the one section of the slotted waveguide by the gap; and
 a coupling device,
 wherein the one antenna of the fixed station that projects into the one section of the slotted waveguide and the other antenna of the fixed station that projects into the other section of the slotted waveguide are each coupled via the coupling device to the transmitting and receiving device of the fixed station and also to each other, so as to enable coupling of signals between the transmitting and receiving device of the fixed station and each of the two sections of the slotted waveguide as well as continuous signal transmission over the gap that separates the two sections of the slotted waveguide.

2. The communication system according to claim 1, wherein the coupling device includes a reciprocal reactive 2-way power divider with an input connection and two output connections, the input connection being connected to the transmitting and receiving device and the output connections being connected to the one antenna of the fixed station and the other antenna of the fixed station.

3. The communication system according to claim 2, wherein the power divider is symmetrical.

4. The communication system according to claim 1, wherein the coupling device includes two reciprocal 2-way directional couplers and a reciprocal 2-way power divider, and
the input connections of the directional coupler are connected to the one antenna of the fixed station and the other antenna of the fixed station, one output connection of each directional coupler is connected to the output connection of the other directional coupler, the other output connection of each directional coupler is connected to one of the output connections of the power divider, and the input connection of the power divider is connected to the transmitting and receiving device.

5. The communication system according to claim 4, wherein the power divider is a Wilkinson divider.

6. The communication system according to claim 4, wherein the two reciprocal 2-way directional couplers are combined so as to form one structural unit with four external connections.

7. The communication system according to claim 1, wherein the coupling device includes a reciprocal 2-way tapper with a branch connection and two through connections, the branch connection being connected to the transmitting and receiving device and the through connections being connected to the one antenna of the fixed station and the other antenna of the fixed station.

8. The communication system according to claim 7, wherein the tapper is symmetrical.

9. The communication system according to claim 1, wherein the slotted waveguide includes a plurality of sections,
the communication system includes a plurality of transmitting and receiving devices of the fixed station, a plurality of antennas of the fixed station, and a plurality of coupling devices, and
each of the transmitting and receiving devices of the fixed station is connected via one of the coupling devices to two of the antennas of the fixed station that project into different sections of the slotted waveguide.

10. The communication system according to claim 9, wherein the transmitting and receiving devices of the fixed station communicate at least partially with a transmitting and receiving device of the vehicle via different channels.

11. A communication system for communication between a vehicle guided along a predetermined movement path and a fixed station using a slotted waveguide that extends parallel to the movement path and into which can project at least one antenna of the vehicle, which is moved in the longitudinal direction of the slotted waveguide during movement of the vehicle, the slotted waveguide including a first section and a second section that separated from each other by a gap, the communication system comprising:
a transmitting and receiving device for the fixed station;
a first antenna that projects into the first section of the slotted waveguide;
a second antenna that projects into the second section of the slotted waveguide, which is separated from the first section of the slotted waveguide by the gap; and
a coupling device coupled between the transmitting and receiving device and the first and second antennas,
wherein the coupling device couples the transmitting and receiving device to both the first antenna and the second antenna, and the coupling device also couples the first antenna and the second antenna to each other, so as to enable coupling of signals between the transmitting and receiving device for the fixed station and each of the first and second sections of the slotted waveguide as well as continuous signal transmission over the gap that separates the first and second sections of the slotted waveguide.

12. The communication system according to claim 11, wherein the coupling device includes a reciprocal reactive 2-way power divider with an input connection and first and second output connections, the input connection being connected to the transmitting and receiving device, the first output connection being connected to the first antenna, and the second output connection being connected to the second antenna.

13. The communication system according to claim 11, wherein the coupling device includes first and second reciprocal 2-way directional couplers and a reciprocal 2-way power divider, and
an input connection of the first directional coupler is connected to the first antenna, a first output connection of the first directional coupler is connected to a first output connection of the second directional coupler, and a second output connection of the first directional coupler is connected to a first output connection of the power divider,
an input connection of the second directional coupler is connected to the second antenna, and a second output connection of the second directional coupler is connected to a second output connection of the power divider, and
an input connection of the power divider is connected to the transmitting and receiving device.

14. The communication system according to claim 11, wherein the coupling device includes a reciprocal 2-way tapper with a branch connection and first and second through connections, the branch connection being connected to the transmitting and receiving device, the first through connection being connected to the first antenna, and the second through connection being connected to the second antenna.

15. A communication system for communication between a vehicle guided along a predetermined movement path and a fixed station using a slotted waveguide that extends parallel to the movement path and into which can project at least one antenna of the vehicle, which is moved in the longitudinal direction of the slotted waveguide during movement of the vehicle, the slotted waveguide including a plurality of sections with adjacent sections separated from each other by a gap, the communication system comprising:
a plurality of transmitting and receiving device connected to the fixed station;
a plurality of antennas that each project into one of the sections of the slotted waveguide; and
a plurality of coupling devices,
wherein each of the transmitting and receiving devices is coupled via one of the coupling devices to two of the antennas that project into two adjacent sections of the slotted waveguide, this one coupling device also coupling these two antennas to each other, so as to enable coupling of signals between each of the transmitting and receiving devices and two adjacent sections of the slotted waveguide as well as continuous signal transmission over the gap that separates the two adjacent sections of the slotted waveguide.

* * * * *